US012480348B2

(12) United States Patent
Herzog et al.

(10) Patent No.: US 12,480,348 B2
(45) Date of Patent: Nov. 25, 2025

(54) DEFLECTION DEVICE FOR A MOTOR VEHICLE WINDOW LIFT, WINDOW LIFT AND DOOR MODULE

(71) Applicant: Brose Fahrzeugteile SE & Co. Kommanditgesellschaft, Bamberg, Bamberg (DE)

(72) Inventors: Hans Herzog, Strullendorf (DE); Sebastian Höhn, Neustadt (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 564 days.

(21) Appl. No.: 17/953,538

(22) Filed: Sep. 27, 2022

(65) Prior Publication Data

US 2023/0018129 A1 Jan. 19, 2023

Related U.S. Application Data

(63) Continuation of application No. PCT/EP2021/057666, filed on Mar. 25, 2021.

(30) Foreign Application Priority Data

Mar. 27, 2020 (DE) ..................... 10 2020 204 027.3

(51) Int. Cl.
*E05F 11/48* (2006.01)

(52) U.S. Cl.
CPC ....... *E05F 11/483* (2013.01); *E05Y 2201/654* (2013.01); *E05Y 2201/66* (2013.01); *E05Y 2800/676* (2013.01); *E05Y 2900/55* (2013.01)

(58) Field of Classification Search
CPC ............. E05F 11/483; E05Y 2201/654; E05Y 2201/66; E05Y 2900/55
See application file for complete search history.

(56) References Cited

U.S. PATENT DOCUMENTS

| | | | | |
|---|---|---|---|---|
| 5,040,430 A * | 8/1991 | Adam | E05F 15/697 74/425 |
| 6,151,833 A * | 11/2000 | Gmurowski | E05F 11/483 49/352 |
| 6,571,515 B1 * | 6/2003 | Samways | B60J 5/0416 49/502 |
| 9,476,496 B2 * | 10/2016 | Fukumoto | E05F 11/483 |

(Continued)

FOREIGN PATENT DOCUMENTS

| | | |
|---|---|---|
| CN | 207033183 U | 2/2018 |
| DE | 19855011 C1 | 1/2000 |

(Continued)

*Primary Examiner* — Anna M Momper
*Assistant Examiner* — Mark K Buse
(74) *Attorney, Agent, or Firm* — Laurence A. Greenberg; Werner H. Stemer; Ralph E. Locher

(57) ABSTRACT

A deflection device is for a traction cord of a window lift of a motor vehicle. The deflection device has a cord pulley, which has a circumferential track for the traction cord and a central bearing opening, and a carrier for the cord pulley. A carrier-side journal is provided for rotatably mounting the cord pulley, wherein the cord pulley is ring-shaped and has an internal ring wall surrounding the central bearing opening and an external ring wall having the track. The ring-shaped cord pulley is joined to the journal with a snap-fit assembly.

14 Claims, 6 Drawing Sheets

(56) References Cited

U.S. PATENT DOCUMENTS

| | | | | |
|---|---|---|---|---|
| 9,580,953 | B1 * | 2/2017 | Matsushita | E05F 11/483 |
| 10,094,510 | B2 * | 10/2018 | Nebreda De La Iglesia | E05F 11/483 |
| 10,287,814 | B2 * | 5/2019 | Fortin | E05D 15/165 |
| 10,829,973 | B2 | 11/2020 | Hazon et al. | |
| 11,248,408 | B2 | 2/2022 | Eisentraudt | |
| 2010/0119295 | A1 * | 5/2010 | Renke | E05F 11/483<br>403/14 |

FOREIGN PATENT DOCUMENTS

| | | | |
|---|---|---|---|
| DE | 10156056 | A1 | 5/2003 |
| DE | 102006042136 | A1 | 3/2007 |
| DE | 202005017112 | U1 | 3/2007 |
| DE | 202006015585 | U1 | 2/2008 |
| DE | 202008010920 | U1 | 1/2010 |
| DE | 102009051992 | A1 | 6/2010 |
| EP | 1728957 | A1 | 12/2006 |
| FR | 3041676 | A1 | 3/2017 |
| GB | 2388158 | A | 11/2003 |
| WO | 2018224415 | A1 | 12/2018 |

* cited by examiner

DEFLECTION DEVICE FOR A MOTOR VEHICLE WINDOW LIFT, WINDOW LIFT AND DOOR MODULE

CROSS-REFERENCE TO RELATED APPLICATION

This application is a continuation, under 35 U.S.C. § 120, of copending International Patent Application PCT/EP2021/057666, filed Mar. 25, 2021, which designated the United States; this application also claims the priority, under 35 U.S.C. § 119, of German Patent Application DE 10 2020 204 027.3, filed Mar. 27, 2020; the prior applications are herewith incorporated by reference in their entirety.

FIELD AND BACKGROUND OF THE INVENTION

The invention concerns a deflection device for a traction cable of a window lift of a motor vehicle, with a cable roller for deflecting the traction cable and with a bearing element for rotatable mounting of the cable roller. It also concerns a window lift for adjusting a window glass of a motor vehicle, and a door module for a vehicle door.

A window lift, also described below as a window lift assembly, of a motor vehicle contains a carrier component (carrier) and a guide device arranged thereon for guiding a flexible traction means (traction cable), via which an adjustment moment (adjustment force) generated by a (electromotor) window lift drive can be transmitted to a window glass to be adjusted. The guide device is typically formed by deflection means and one or more guide rail(s), by means of which the traction cable is guided in an adjustment portion in the adjustment direction of the window glass to be adjusted. The carrier component on which the guide device is received may be a module carrier which, together with function components pre-mounted thereon, such as in particular the components of the window lift, is installed in a motor vehicle door.

At least one support or rail slide is attached to the traction cable which is guided by means of the guide device, and connects the window glass to be adjusted to the traction cable. The support is located on an adjustment portion of the traction cable which extends along a guide rail running in the adjustment direction, and here engages in the guide rails in linearly movable fashion. In this way, the support and the adjustment portion of the traction cable, and also the window glass to be adjusted, are guided along the guide rails. Thus, when force is applied to the traction cable, the window glass is adjusted by means of the assigned adjustment drive, via the support, along an elongate adjustment track which is predefined by the guidance of the carrier and traction cable by means of the guide device.

On a movement along the adjustment track, the supports of a so-called double-line window lift and the window glass to be adjusted move on an adjustment surface which is predefined or defined by the adjustment track. In order here to be able to guide the traction cable, which is coupled to and departs from the adjustment drive, along the guide rails in targeted fashion, deflection means are provided. The deflection means may take the form of approximately semicircular deflection pieces or contours, or cable rollers which are rotatably mounted in the region of or at the rail ends of the guide rails.

Such a rotationally fixed deflection piece, arranged on the carrier component of a window lift assembly, is known from international patent disclosure WO 2018/224415 A1, corresponding to U.S. Pat. No. 11,248,408. The deflection piece has a guide channel for deflecting the traction cable in a guide plane which lies in or is parallel to the x-z plane in a typical vehicle coordinate system. The deflection piece may in principle be configured as separate component fixed to the carrier component. The proposed material for this is polyarylether plastic, which is however very cost-intensive and also does not have the desired resistance to wear due to the abrasion of the deflection piece, which occurs even with such a material after a plurality of adjustment cycles, caused by the traction cable which is typically made of commercial steel. Also, a pressing of the traction cable into the plastic carrier component leads to acoustic disadvantages, in particular in the form of undesired noise emissions.

The cable rollers, known as deflection rollers, typically have a central bore through which the cable roller is connected to the guide rail or another supporting part of a cable window lift by means of a clinch bolt (see German patent DE 198 55 011 C1) or a push or stepped bolt (see German utility model DE 20 2008 010 920 U1). As securing and mounting elements for the cable roller, German utility model DE 20 2005 017 112 U1 discloses screw and clip elements with widened head. Such deflection devices are already costly because of the provision of the securing and bearing elements as additional components. Also, typical requirements for strength, for example a heat-creep test, are often not fulfilled, in particular if the cable roller is to be attached to a plastic carrier.

SUMMARY OF THE INVENTION

The invention is based on the object of indicating a particularly suitable deflection device for a traction cable of a window lift or window lift assembly of a motor vehicle. In particular, the deflection device allows simple, preferably automated installation of the cable roller with as few components as possible. Furthermore, a suitable window lift or window lift assembly with such a deflection device, and a suitable door module with such a window lift (window lift assembly) are indicated.

This object is achieved according to the invention with respect to the deflection device with the features of the independent deflection device claim, and with respect to the window lift or window lift assembly with the features of the independent window lift claim, and with respect to the door module with the features of the independent door module claim. Advantageous embodiments, refinements and variants are the subject of the subclaims.

With the foregoing and other objects in view there is provided, in accordance with the invention, a deflection device for a traction cable of a window lift of a motor vehicle. The deflection device contains a cable roller which has a circumferential running channel for the traction cable and a central bearing opening formed therein. The cable roller is annular and has an inner ring wall surrounding the central bearing opening and an outer ring wall has the circumferential running channel. A carrier for the cable roller is provided. A carrier-side bearing journal for rotatable mounting of the cable roller is further provided. The cable roller is joined to the carrier-side bearing journal with a snap-fit connection.

The deflection device for deflecting a traction cable of a window lift of a motor vehicle contains a cable roller (deflection roller) and a carrier (carrier component), and a carrier-side bearing journal for rotatable mounting of the cable roller. The carrier preferably consists of plastic, i.e. is suitably a plastic part. The carrier may also be a guide rail, for example made of steel or aluminum, and the bearing journal may be a molding or flow pressing of the guide rail, or a bearing bolt assigned thereto and joined for example to a door module or similar.

The cable roller (deflection roller) has a running channel for the traction cable and a central bearing opening. The cable roller, which has the shape of a ring and is thus annular, is configured with an inner ring wall surrounding the central bearing opening and an outer ring wall with the circumferential running channel (cable or guide channel) for the traction cable.

The annular cable roller is joined to the bearing journal with a snap-fit connection. In other words, the cable roller is clipped or latched directly to the bearing journal. Suitably, an in particular bead-like annular chamber is formed between the inner ring wall and the outer ring wall of the cable roller.

Advantageously, the bearing journal is a cylindrical or hollow-cylindrical molding of the carrier, i.e. formed directly from the carrier material. Alternatively, the bearing journal is a molding or flow pressing of the guide rail, then forming the carrier, or a bearing bolt assigned thereto with a shank and a head at a shank end. The carrier-side bearing journal forms the physical bearing (rotational axis) of or for the cable roller.

The cable roller is suitably made of plastic, in particular a polymer, for example polyether ether ketone (PEEK) or polyamide (PA) or polyoxymethylene (POM). A metal sleeve, in particular over-molded, is inserted, in particular pressed, into the central bearing opening of the cable roller. This allows a particularly large inner diameter of the central bearing opening (bearing diameter) with simultaneously minimal material usage for the annular cable roller.

The inner diameter of the central bearing opening amounts to at least two-thirds (⅔) of the outer diameter of the cable roller. Preferably, the ratio between the inner diameter of the inner ring wall and the outer diameter of the outer ring wall of the cable roller is less than one (1), in particular less than 0.9, preferably less than 0.8, and greater than 0.4, in particular greater than 0.5, preferably greater than 0.7.

According to a particularly suitable embodiment of the cable roller, this has a number of latching tongues arranged on the circumferential side, preferably evenly distributed. The latching tongues on the cable roller side are suitably molded onto the inner ring wall of the cable roller. Particularly preferably, the latching tongues protrude axially beyond the inner ring wall and are directed radially inwardly, i.e. towards the rotational or bearing axis of the cable roller. Inner wall portions are formed between the latching tongues and, in joined state, bear thereon when the snap connection is created between the cable roller and the bearing journal, forming a plain bearing between the cable roller and the bearing journal.

The latching tongues on the cable roller side latch or clip into a corresponding latching groove of the bearing journal, creating the snap connection. In the snap connection, when the latching tongues of the cable roller are latched or clipped into the preferably circumferential latching groove of the bearing journal, the latching tongues on the cable roller side resume their original or normal position which existed before the joining. In other words, the latching tongues on the cable roller side are in a normal position before the joining process, are deflected out from this during the joining process in a radially flexible, elastic fashion to create the snap connection, and resume the normal position after the snap connection. This ensures that, after the snap connection, the latching tongues do not lie on the bearing journal in sprung-elastic fashion under a certain pressing force and corresponding friction force. In this way, an undesired abrasion of the latching tongues or bearing journal and resulting running noises are avoided.

In a variant, the bearing journal has a number of latching elements distributed on the circumferential side, in particular in the manner of a crown, behind which the cable roller, in particular its inner ring wall, engages to create the snap connection. Alternatively, radially outwardly directed latching elements are formed on the inner ring wall of the cable roller, and engage in a preferably circumferential ring groove of the bearing journal to create the snap connection.

Advantageously, the cable roller contains a mounting channel, e.g. continuous in the circumferential direction, running coaxially to the running channel, for introducing the traction cable into the running channel. Suitably, the mounting channel is formed from a plurality of partial contact grooves. These are preferably arranged alternately with the latching tongues, i.e. each adjacent thereto, on the periphery of the annular cable roller.

Suitably, the mounting channel, in particular each of the contact grooves, is molded onto the outer ring wall or between this and the inner ring wall on the cable roller. The contact grooves form local receiving points for the traction cable when this is initially introduced into the mounting channel during assembly. The diameter of the mounting channel is here suitably smaller than that of the running channel, which simplifies the threading of the traction cable onto the cable roller. A local insertion point provided on the periphery of the cable roller, (axially) between the mounting channel and the running channel, and at which the mounting channel opens into the running channel, allows automatic insertion of the traction cable in the running channel as or when the cable roller is driven in the rotation direction for the first time. During this insertion of the traction cable, this is tightened automatically because of the diameter increase along the local insertion point and hence compensates for cable slack in the traction cable.

The deflection device is particularly suitable for a window lift or window lift assembly for adjusting a window glass of a motor vehicle, but also for a door module of a vehicle door in which a window glass, to be adjusted by means of the window lift, can be moved between an open position and a closed position. The window lift for adjusting the window glass has a carrier or carrier component and a (flexible) traction cable for transmitting an adjustment force for adjusting the window glass. The door module for a vehicle door contains such a window lift and is suitably installed between a door outer skin (door panel) and a door inner covering (door interior trim).

The advantages achieved with the invention are in particular that the deflection device contains practically only two pieces and therefore few components. Also, the cable roller can be mounted particularly easily and preferably automatically. Furthermore, there is practically no wear on the traction cable and/or running channel of the cable roller, and practically no disruptive noise is generated between the traction cable and cable roller. Furthermore, the cable roller can be mounted particularly flexibly and optimized for slip with grease pockets. For this, suitably, an annular groove is made in the bearing journal, in particular coaxially to the latching groove, for receiving grease.

Other features which are considered as characteristic for the invention are set forth in the appended claims.

Although the invention is illustrated and described herein as embodied in a deflection device for a motor vehicle window lift, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts carry the same reference signs in all figures.

Figure 1:
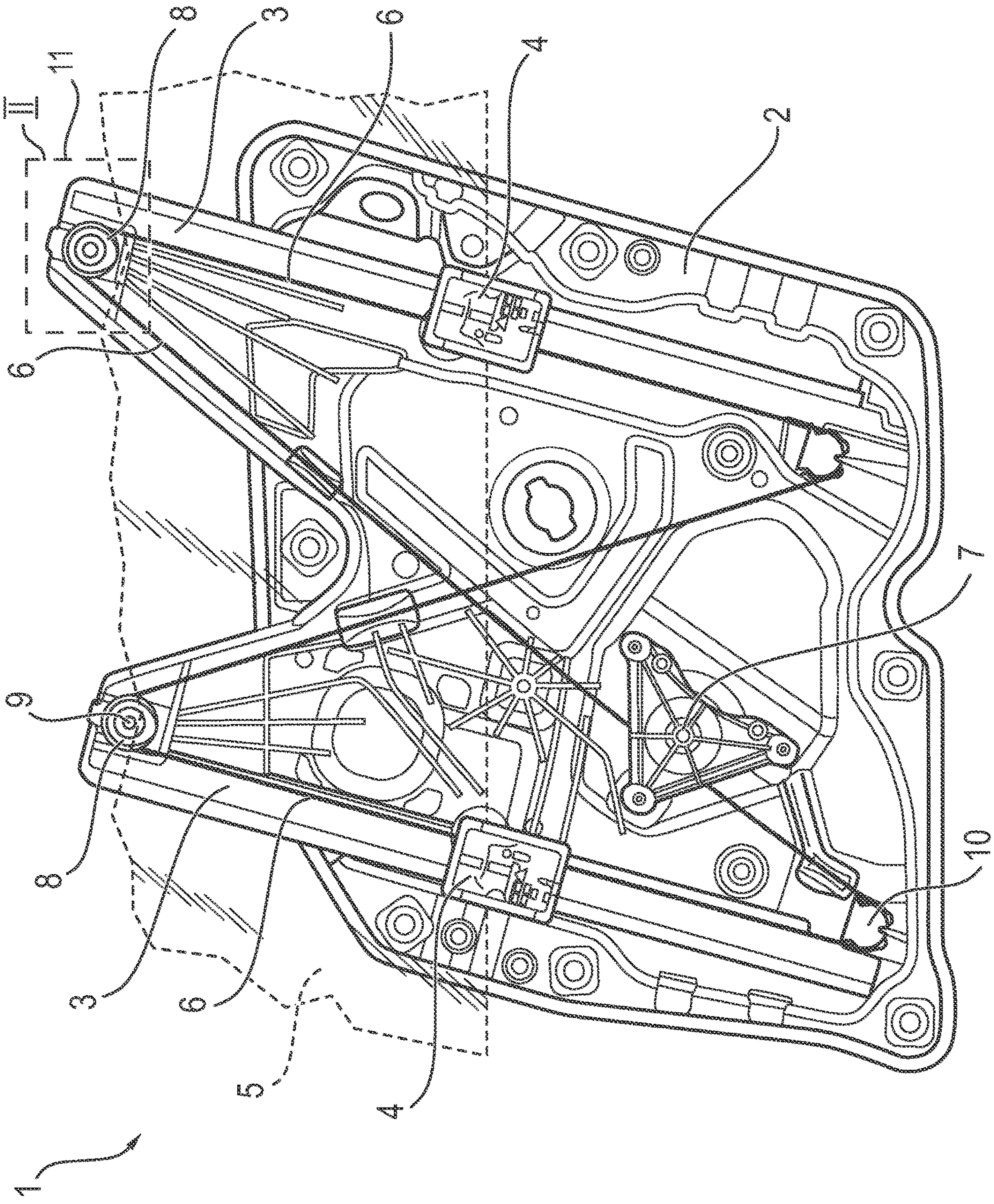
FIG. 1 is a top, perspective view a cable window lift as a window lift assembly with a carrier (carrier component) and with supports guided along two guide rails for a motor vehicle window glass, and with a traction cable coupled to the supports and to an adjustment drive, which cable is guided in portions on carrier-fixed deflection elements in the form of rotatably mounted cable rollers and carrier-fixed deflection pieces.

Referring now to the figures of the drawings in detail and first, particularly to FIG. 1 thereof, there is shown in a top view a window lift assembly 1 with a carrier component, described below as a carrier 2, which is advantageously made of a plastic and is therefore a plastic component. Two (substantially) mutually parallel guide rails 3 are mounted on the carrier 2, on which rails supports (rail slides) 4 are mounted for sliding movement. A window glass 5, indicated in dotted lines, is held on the supports 4. The supports 4 are connected to a traction cable 6 as a flexible traction means, which has multiple deflections and is coupled to an electromotor adjustment drive 7.

In this exemplary embodiment, as a deflection device 11, a cable roller (deflection roller) 8 is provided on each upper rail end of the guide rails 3, and is mounted rotatably on carrier-side bearing journals 9. The bearing journals 9 are preferably molded from the material of the carrier 2. In other words, the respective bearing journal 9 is formed (molded) from the actual carrier material as a cylindrical or hollow-cylindrical molded body.

In the exemplary embodiment, in the region of the lower rail ends of the guide rails 3, semicircular rotationally fixed deflection elements 10 are provided which are preferably also molded from the material of the carrier 2. Via these rotationally fixed deflection elements 10, and via the rotatably mounted cable rollers 8, the traction cable 6 is deflected, over traction cable portions running along the guide rails 3, into traction cable portions running diagonally between the guide rails 3 and crossing one another. The adjustment drive 6 is arranged in one of these diagonal traction cable portions. Instead of the rotationally fixed deflection elements 10, also rotatably mounted cable rollers on the carrier side may be provided in the region of the lower rail ends of the guide rails 3.

Figure 2:
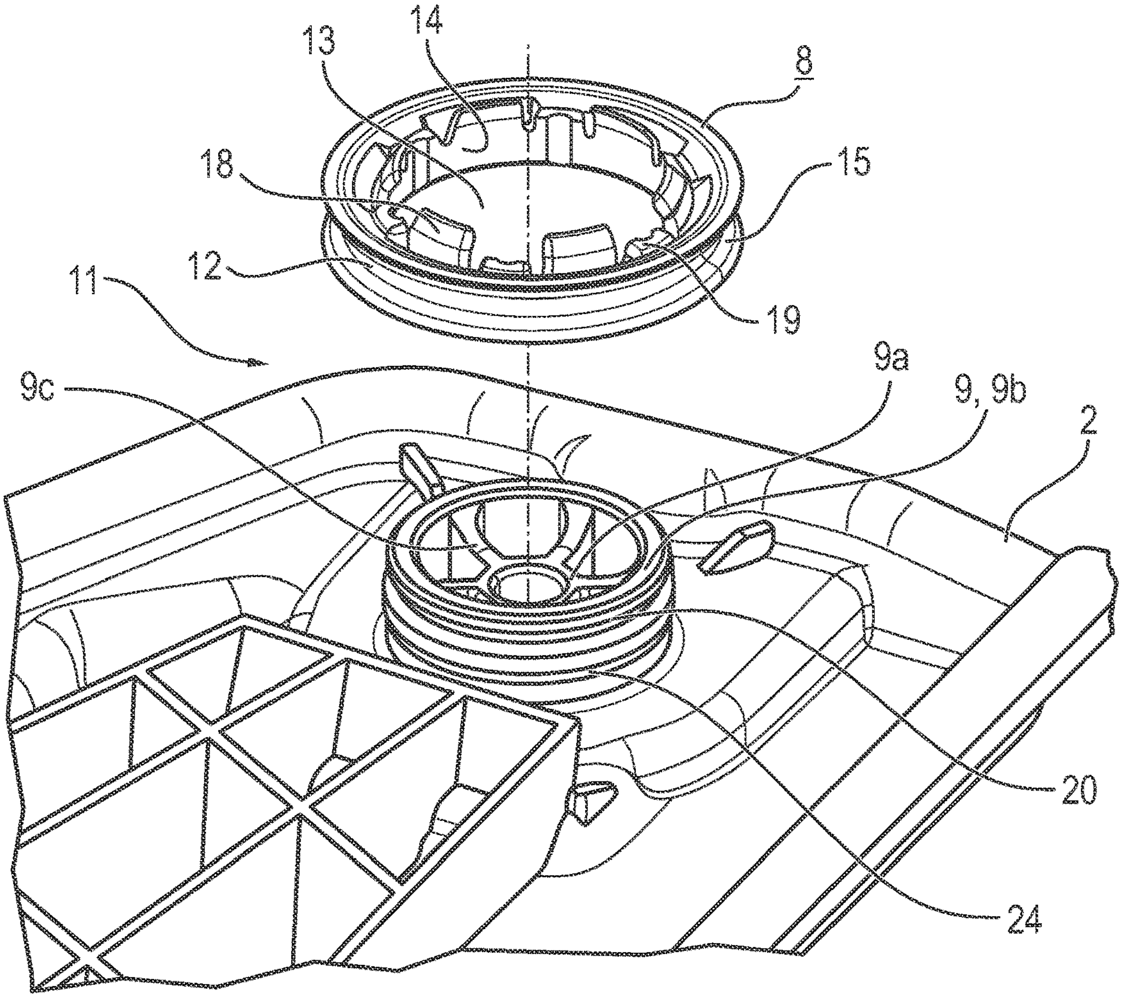
FIG. 2 is an exploded perspective view of detail II shown in FIG. 1 in larger scale, of a cable roller in ring form axially above a carrier-side bearing journal, in a mounting step before the snap connection is created by latching or clipping the annular cable roller to the carrier-side bearing journal.
Figure 3:
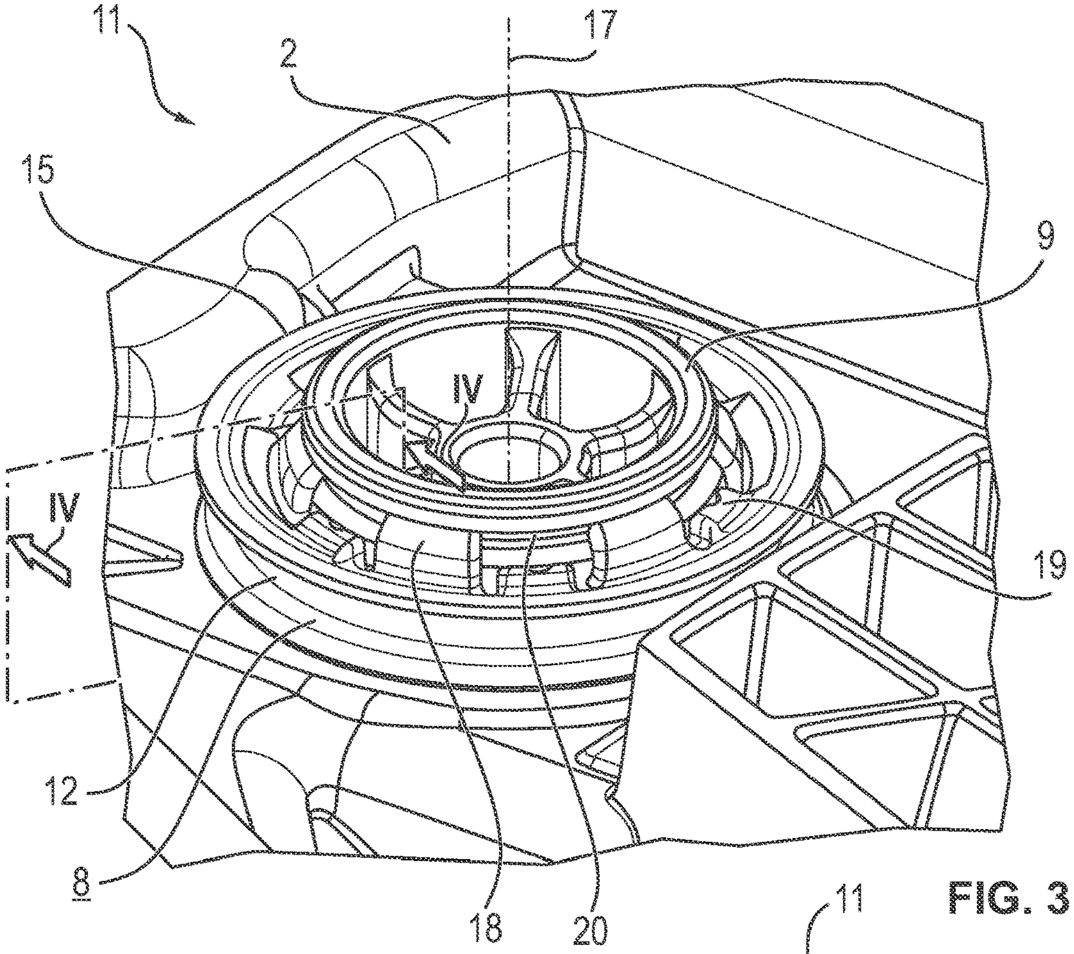
FIG. 3 is a perspective view of a part of FIG. 2 in larger scale with the cable roller joined to the bearing journal in the snap connection.
Figure 4:
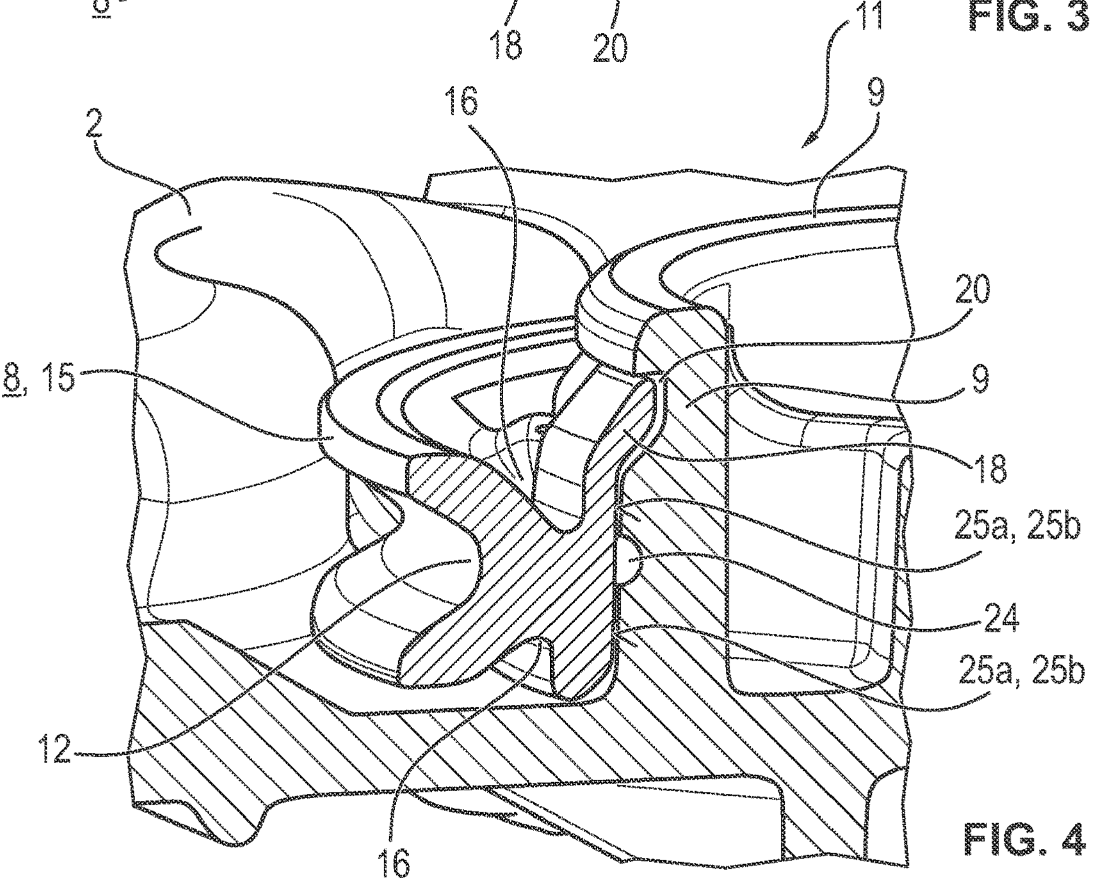
FIG. 4 is a sectional view of the part of FIG. 2 taken along the line IV-IV shown in FIG. 3, with a view of a grease reservoir in a region of a slip face between the cable roller and the bearing journal.
Figure 5:
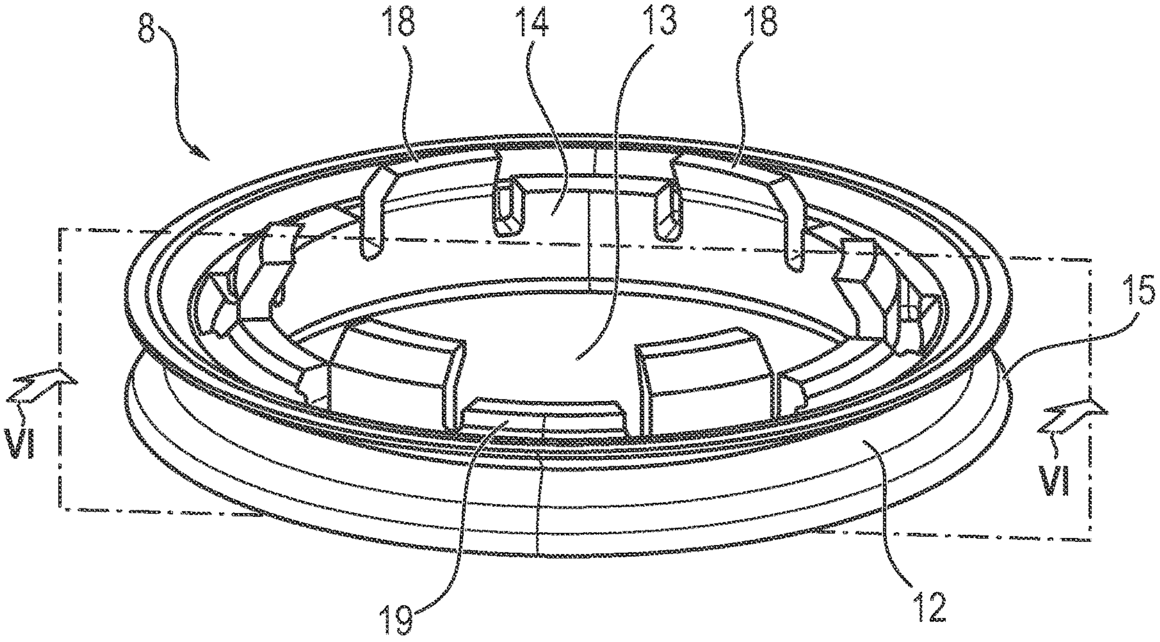
FIG. 5 is a perspective view of the annular cable roller of a running channel in an outer ring wall, and with axially protruding and radially inwardly directed latching tongues on an inner ring wall.

FIGS. 2 to 4 show the deflection device 11 in a premounting state in which the cable roller 8 is not yet joined to the bearing journal 9 (FIG. 2), and in joined state in which a snap connection has been created between the cable roller 8 and the bearing journal 9 (FIGS. 3 and 4). In the snap connection, the cable roller 8 is clipped or latched directly onto the bearing journal 9. The deflection device 11 consists almost solely of the cable roller 8, for deflecting a traction cable 6 of the window lift 1, and the carrier-side bearing journal 9, i.e. that formed from the carrier 2, as a pivot bearing for the cable roller 8.

The cable roller 8 has a running channel 12 for the traction cable 6 and a central bearing opening 13. The cable roller 8 has the form of a ring between an inner ring wall 14, surrounding the central bearing opening 13, and an outer ring wall 15. The circumferential running channel (cable or guide channel) 12 for the traction cable 6 is molded therein. An annular chamber 16 is formed between the inner ring wall 14 and the outer ring wall 15 of the cable roller 8. In this exemplary embodiment, this is configured as a bead (bead-like). In other words, in this embodiment, the cable roller 8 has a waisted cross-sectional form, as comparatively clearly evident from FIGS. 4 and 6. The annular chamber 16 may however also be omitted, i.e. be effectively filled with plastic material, in particular that of the cable roller.

The carrier-side bearing journal 9 forms the physical bearing axis (rotational axis) 17 of the cable roller 8, and is molded out of the carrier material as a hollow-cylindrical molding of the carrier 2. The bearing journal 9 has a number of radial ribs 9*c* connecting an inner wall 9*a* and an outer wall 9*b* coaxial thereto (FIG. 2).

As evident from FIGS. 2 to 6, the cable roller 8 has a number of—in this exemplary embodiment, six (6)—latching tongues 18 evenly distributed on the circumferential side. These latching tongues 18 on the cable roller side are molded onto the inner ring wall 14 of the cable roller 8. With respect to the bearing axis 17, the latching tongues 18 protrude axially beyond the inner ring wall 14 and here also the outer ring wall 15, and are directed radially inwardly. Wall portions (inner wall or cable roller portions) 19 are formed between the latching tongues 18. In joined state, after creation of the snap connection of the cable roller, these lie on the bearing journal 9 and, as a corresponding component of the inner ring wall 13, form a particularly low-friction plain bearing between the cable roller 8 and the bearing journal 9.

The latching tongues 18 on the cable roller side latch or clip into a corresponding (circumferential) latching groove 20 of the bearing journal 9 and create a snap connection S (FIG. 4). During creation of the snap connection S, the spring-elastic latching tongues 18 are deflected radially. When the latching tongues 18 of the cable roller 8, on the cable roller side, are clipped into the latching groove 20 of the bearing journal 9, they resume the normal position shown in FIGS. 2 and 5. In this way, an undesired abrasion of the latching tongues 18 and bearing journal 9, and hence running noise or disruptive noise, are avoided.

The cable roller 8 preferably consists of plastic, for example a polymer. Particularly suitable plastics are polyether ether ketone (PEEK), polyoxymethylene (POM) and polyamide (PA).

Figure 6:
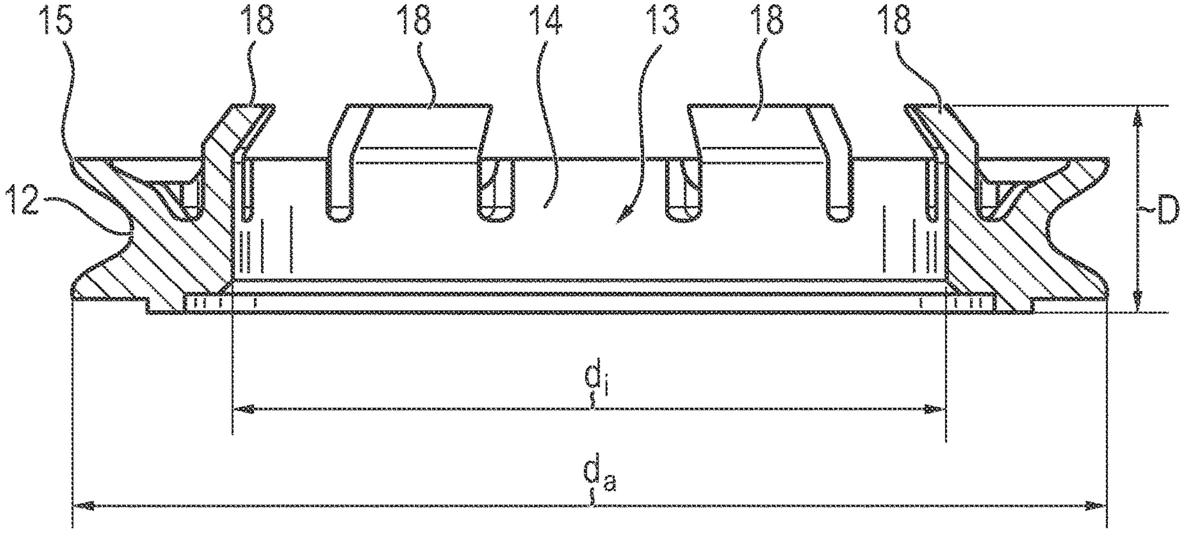
FIG. 6 is a sectional view taken along the line VI-VI shown in FIG. 5 of the annular cable roller.

As evident from the sectional illustration of the cable roller 8 in FIG. 6, the inner diameter di of the cable roller 8 in the region of the central bearing opening 13 amounts to at least two-thirds (⅔) of the outer diameter da of the cable roller 8. In this exemplary embodiment, the ratio between the inner diameter di and the outer diameter di of the cable roller 8 is between 0.7 and 0.75. The axial roller thickness D of the cable roller 8, including the axially protruding latching tongues 18, amounts to one-fifth (⅕) to one-quarter (¼) of the outer diameter di, and approximately one-third (⅓) of the inner diameter di of the cable roller 8.

Figure 7:
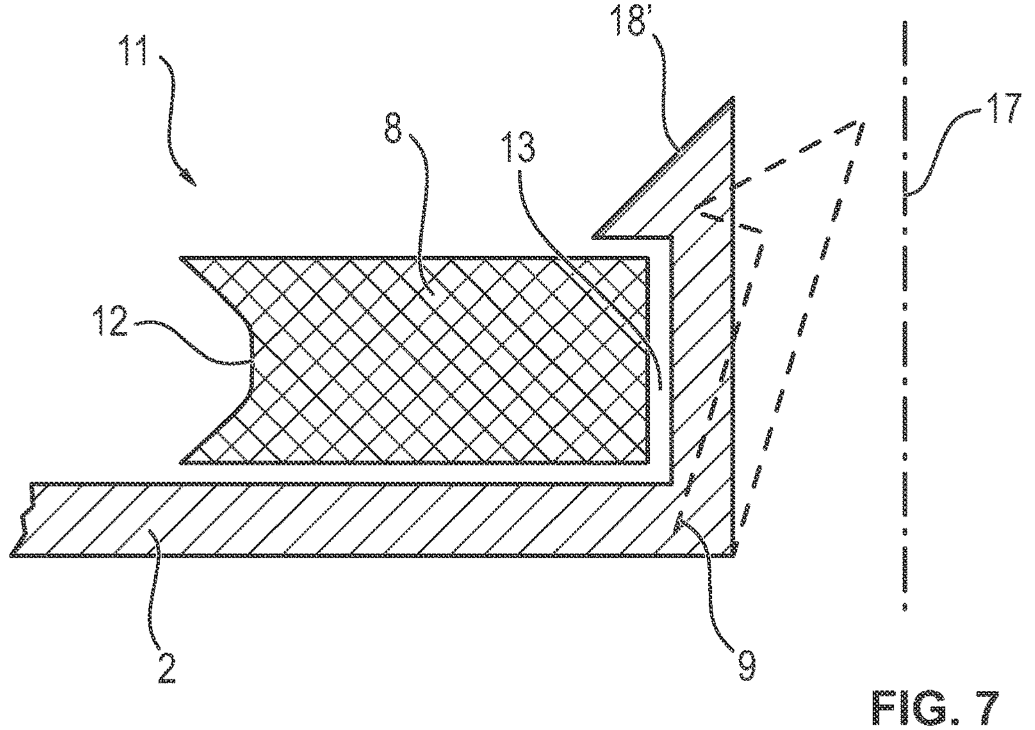
FIG. 7 is a schematic partial illustration, of a variant of the snap connection between the annular cable roller and a crown-like or crenellated carrier-side bearing journal.

FIG. 7 shows, in simplified and extract form, a sectional illustration of a variant of the deflection device 11. In this exemplary embodiment, the bearing journal 9 has a number of crown-like latching elements 18' which are evenly distributed on the circumferential side. During creation of the snap connection S, the latching elements 18' on the bearing journal side are deflected radially inward relative to the bearing axis 17 and the central bearing opening 13 of the cable roller 8, as illustrated in dotted lines. In the snap connection S, the latching elements 18' on the bearing journal side engage over the cable roller 8. The latching elements 18' on the bearing journal side clip behind a suitable face of the cable roller 8 in order to fix this axially.

Figure 8:
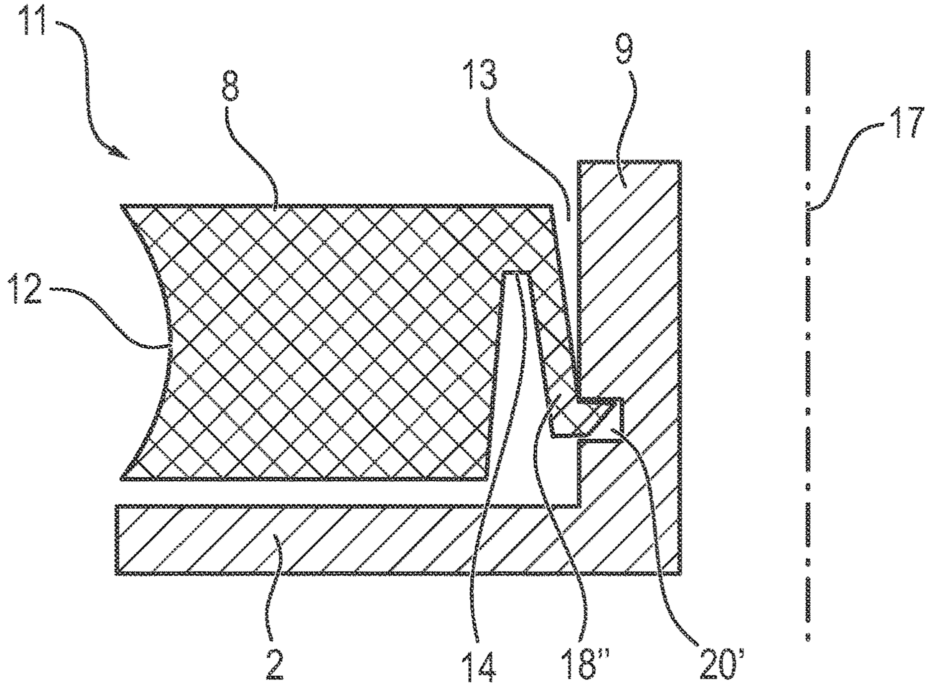
FIG. 8 is an illustration according to FIG. 7, of a further variant of the snap connection between the annular cable roller with radially outwardly directed latching tongues and corresponding latching groove in the carrier-side bearing journal.

In the variant of the deflection device 11 shown in FIG. 8, again in simplified and extract form and in a sectional illustration, radially outwardly directed latching elements 18" are molded onto the cable roller 8 in the region of the central bearing opening 13, and hence on the inner ring wall 14 of the cable roller 8. In the snap connection, these engage in a preferably circumferential ring or latching groove 20' of the bearing journal 9.

Figure 9:
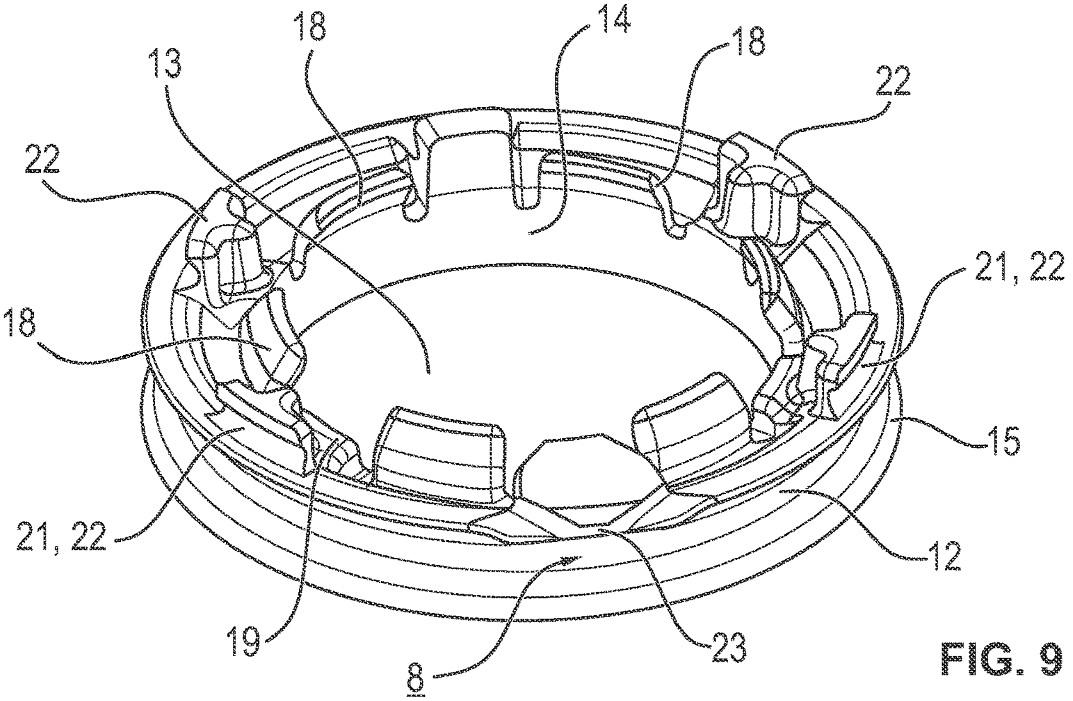
FIG. 9 is a perspective illustration of a variant of the annular cable roller with a mounting channel coaxial to the running channel, for automatic insertion or threading of the traction cable.

The cable roller 8 illustrated schematically in FIG. 9 has a mounting channel 21, coaxial to the running channel 12, for insertion of the traction cable 6 into the running channel 12. The mounting channel 21 in this exemplary embodiment is segmented, and for this formed from a number of—in this exemplary embodiment, five—partial contact grooves 22. The contact grooves 22 and hence the mounting channel 21 are/is formed on the cable roller 8 between the outer ring wall 14 and the inner ring wall 15, i.e. in the region of the annular chamber 16. The contact grooves 22 are arranged between the latching tongues 18 and hence adjacent to these. In other words, the contact grooves 22 and the latching tongues 18 are arranged alternately around the circumference of the cable roller 8. The contact grooves 22 form local receiving points for the traction cable 6 when this is first introduced into the mounting channel 21 during assembly.

The diameter of the mounting channel 21 is smaller than that of the running channel 12 of the cable roller 8. This simplifies the threading of the traction cable 6 onto the cable roller 8. A local insertion point 23, provided on the circumference of the cable roller 8 axially between the mounting channel 21 and the running channel 12, opens out of the mounting channel 21 into the running channel 12. This allows automatic insertion of the traction cable 6 into the running channel 12. For this, the cable roller 8 is driven in the rotation direction. During this insertion of the traction cable 6, because of the diameter increase, said cable is tightened (tensioned) along the local insertion point 23 and a cable slack is removed from the traction cable 6.

Again with reference to FIG. 4, an annular groove 24 is made in the bearing journal 8 coaxially to the latching groove 20, for receiving grease (grease reservoir) which, during the rotational movement of the cable roller 8, penetrates between its running or bearing surface **25*a* and the running or bearing surface 25 of the bearing journal 9. In this way, the plain bearing formed between the cable roller 8 and bearing journal 9** has particularly low friction.

Figure 10:
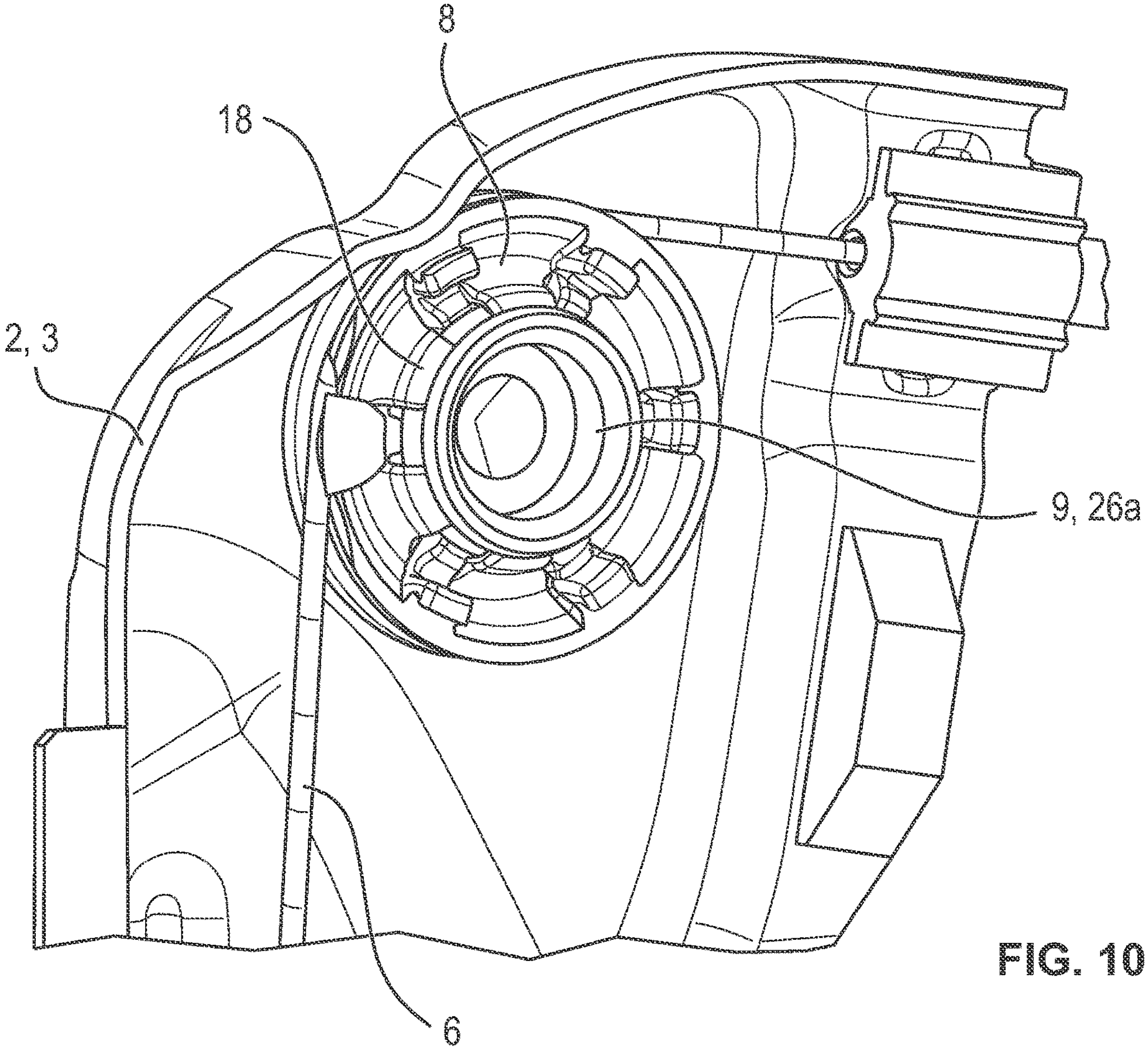
FIG. 10 is a perspective illustration of a variant of the carrier as guide rails with a bearing bolt as the bearing journal, and in the snap connection with the annular cable roller with traction cable guided therein.
Figure 11:
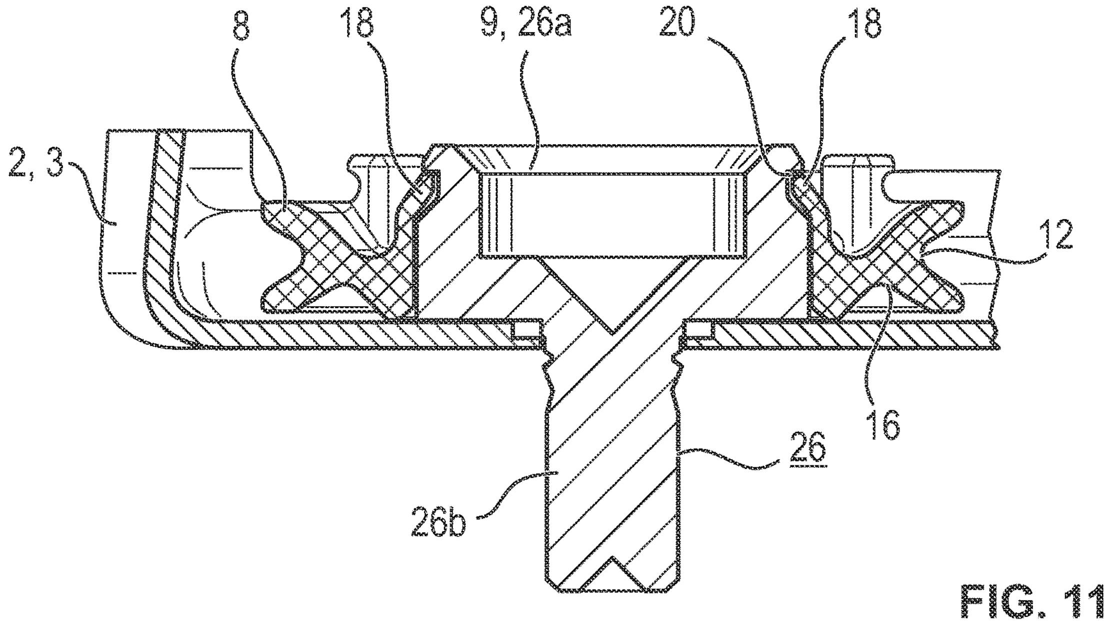
FIG. 11 is a sectional illustration of the variant according to FIG. 10 with the annular cable roller in snap connection with a bolt or bearing head as a bearing journal of the rail-side bearing bolt without traction cable.

FIGS. 10 and 11 show, in perspective and sectional illustrations, a variant of the carrier and bearing journal. The carrier here is a guide rail 3, and the bearing journal is formed (provided) by a bolt bearing head **26*a* of a bearing bolt 26 with a bolt shank 26*b*. The snap connection to the annular cable roller 8, in the running channel 12 of which the traction cable 6 is guided, is created at the bearing head 26*a* of the here bolt-like bearing journal 9. The bearing bolt suitably also serves as a joining element for fixing the guide rail 3 to a module, for example a door module, in particular if the carrier 2 and guide rail 3 are separate components. The material of the guide rail 3** is then suitably steel or aluminum.

To summarize, the invention concerns a deflection device 11 for a traction cable 6 of a window lift 1 of a motor vehicle, containing a cable roller 8 which has a circumferential running channel 12 for the traction cable 6 and a central bearing opening 13, and containing a carrier 2 for the cable roller 8, and a carrier-side bearing journal 9 for rotatable mounting of the cable roller 8, wherein the annular cable roller 8 is joined to the bearing journal 9 in a snap connection, in particular by means of integral latching or clip elements.

The claimed invention is not restricted to the exemplary embodiments described above. Rather, other variants of the invention may be derived therefrom by the person skilled in the art within the context of the disclosed claims, without leaving the subject of the claimed invention. In particular, furthermore, all individual features described in connection with the various exemplary embodiments in the context of the disclosed claims may also be combined in a different fashion without leaving the subject of the claimed invention.

Thus an e.g. over-molded metal sleeve may be inserted in the central bearing opening 13 of the cable roller 8. This allows the annular cable roller 8 to be configured with a particularly large inner diameter di of the central bearing opening 13. Such a large bearing diameter allows minimizing of the material of the annular cable roller 8, in particular if this is particularly thin-walled.

Also, the described solution may be used not only in the particular application case illustrated here, but also in similar designs in other motor vehicle applications, such as for example door and tailgate systems, in window lifts, in vehicle locks, in adjustable seat and interior systems, and in electric drives, controllers, sensors and their arrangement in the vehicle.

The following is a summary list of reference numerals and the corresponding structure used in the above description of the invention:

1 Window lift assembly
2 Carrier/carrier component
3 Guide rail
4 Support/rail slide
5 Window glass
6 Traction cable
7 Adjustment drive
8 Cable/deflection roller
9 Bearing journal
**9*a*** Inner wall
**9*b*** Outer wall
**9*c*** Radial rib
10 Deflection element
11 Deflection device
12 Running channel
13 Bearing opening
14 Inner ring wall
15 Outer ring wall
16 Annular chamber
17 Bearing/rotational axis
18 Latching tongue
19 Wall portions
20 Latching groove
21 Mounting channel
22 Contact groove
23 Insertion point
24 Annular groove
**25*a,b*** Running/bearing face
26 Bearing bolt
**26*a*** Bearing/bolt head
**26*b*** Bearing shank
da,i Outer or inner diameter
D Roller thickness

The invention claimed is:

1. A deflection device for a traction cable of a window lift of a motor vehicle, the deflection device comprising:

a cable roller having a circumferential running channel for the traction cable and a central bearing opening formed therein, said cable roller being annular and having an inner ring wall surrounding said central bearing opening and an outer ring wall having said circumferential running channel;

a carrier for said cable roller; and a carrier-side bearing journal for rotatable mounting of said cable roller, said carrier-side bearing journal having a latching groove formed therein;

said cable roller having a plurality of circumferentially distributed latching tongues being integrally formed on said inner ring wall of said cable roller and engaging in said latching groove of said carrier-side bearing journal, said latching tongues latch or clip said cable roller into said carrier-side bearing journal to create a snap connection; and said cable roller having a mounting channel formed coaxial to said circumferential running channel for introducing the traction cable into said circumferential running channel, and in a circumferential direction of said cable roller, a local insertion point is provided via which said mounting channel opens into said circumferential running channel.

2. The deflection device according to claim 1, wherein:

said carrier-side bearing journal is a cylindrical or hollow-cylindrical molding on said carrier; and said carrier and/or said cable roller is formed from plastic.

3. The deflection device according to claim 2, wherein: said carrier is made from steel or aluminum.

4. The deflection device according to claim 1, wherein:

said central bearing opening of said cable roller has an inner diameter which amounts to at least two-thirds of an outer diameter of said cable roller; and/or a ratio between the inner diameter of said cable roller and said outer diameter of said outer ring wall of said cable roller is less than 1 and greater than 0.4.

5. The deflection device according to claim 4, wherein the ratio is less than 0.9 and greater than 0.5.

6. The deflection device according to claim 4, wherein the ratio is less than 0.8 and greater than 0.7.

7. The deflection device according to claim 1, wherein said latching tongues on a cable roller side protrude axially beyond said inner ring wall and/or said outer ring wall and are directed radially inwardly.

8. The deflection device according to claim 1, wherein said latching tongues on a cable roller side are molded onto said inner ring wall of said cable roller.

9. The deflection device according to claim 1, wherein a bead-shaped annular chamber is formed between said inner ring wall and said outer ring wall of said cable roller.

10. The deflection device according to claim 1, wherein:

said mounting channel is formed from a plurality of partial contact grooves; and/or said mounting channel is molded onto said outer ring wall or between said outer ring wall and said inner ring wall on said cable roller.

11. The deflection device according to claim 1, wherein said latching groove is a circumferential latching groove.

12. A window lift for adjusting a window glass of a motor vehicle, the window lift comprising:

a traction cable for transmitting an adjustment force for adjusting the window glass; and at least one said deflector device according to claim 1 disposed on said carrier.

13. A door module for a vehicle door, the door module comprising:

said window lift according to claim 12.

14. The deflection device according to claim 1, wherein:

said carrier is a guide rail; and said carrier-side bearing journal is a bearing head provided for snap connection to said cable roller and is part of a bearing bolt which is joined or to be joined to said guide rail.

* * * * *